UNITED STATES PATENT OFFICE.

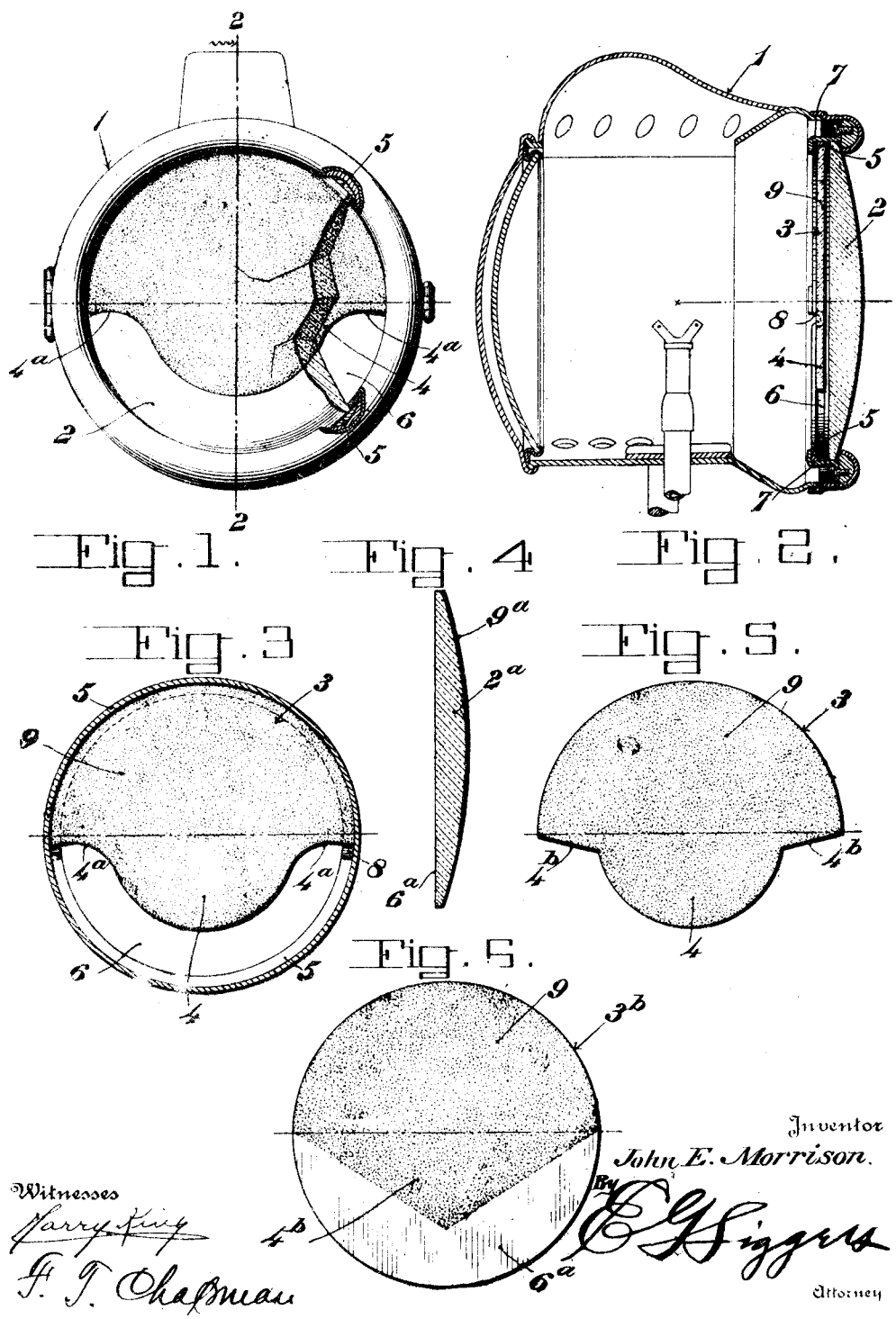

JOHN EDWARD MORRISON, OF MEMPHIS, TENNESSEE, ASSIGNOR TO SAFE-T-LITE CO., OF MEMPHIS, TENNESSEE, A CORPORATION OF TENNESSEE.

GLARE-PREVENTIVE MEANS FOR HEADLIGHTS.

1,132,865. Specification of Letters Patent. Patented Mar. 23, 1915.

Continuation in part of application Serial No. 848,602, filed July 2, 1914. This application filed August 24, 1914. Serial No. 858,266.

*To all whom it may concern:*

Be it known that I, JOHN E. MORRISON, a citizen of the United States, residing at Memphis, in the county of Shelby and State of Tennessee, have invented a new and useful Glare-Preventive Means for Headlights, of which the following is a specification.

This invention has reference to glare preventive means for headlights and the like, and is especially designed for use in connection with automobile headlights of high power so as to tone down or eliminate the glare of the headlight without to any marked extent reducing the efficiency of the emitted cone of light throughout its entire cross-sectional area.

The present invention comprises means which may form a permanent part of the headlight structure or may be separately made and applied to the headlight as an attachment, and the structure is such that the full force of the light as emitted from the light-giving means within the headlight is directed throughout a circumscribed area where illumination is most needed, and also where it will not reach the eye of the observer in front of the headlight either directly or by reflection from the usual reflector within the headlight, while the remainder of the cone of illumination receives practically the same amount of light that it would if the device of the present invention were absent, but the light is so diffused as to be unobtrusive to the eye of the observer because of the elimination of all glare. This is brought about by the interposition of light diffusive means of less area than the light emitting opening of the headlight between the light emitting unit, which is usually an acetylene burner or an incandescent electric bulb, or in some instances an electric arc light, and the eye of the observer, the area and location of the light diffusive means being such as to intercept rays of light which would otherwise reach the eye of the observer by reflection, as well as those which would otherwise reach the eye of the observer directly, and this whether the observer be in front of or more or less to one side of the headlight. There is, however, left at the lower portion of the light emitting opening of the headlight a clear, unobstructed, approximately arc-shaped space of less than 180° circumferential extent through which the rays of light pass with full intensity to illuminate a portion of the roadway ahead of the vehicle and which rays of light under conditions of use are at too low a level to reach the eye of the observer approaching the headlight or toward whom the headlight moves.

While the present invention has wide applicability, being useful in connection with any light projecting apparatus where the glare of the light source of great intensity is liable to be troublesome, the invention is particularly useful in connection with automobile headlights and will be described in connection with such headlights without, however, limiting the use of the invention to such particular purpose.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a front elevation of an automobile headlight provided with the invention, some parts being broken away to show more distant parts. Fig. 2 is a section on the line 2—2 of Fig. 1. some parts being shown in elevation. Fig. 3 is a front elevation with parts in section of an embodiment of the invention adaptable as an attachment to a headlight. Fig. 4 is a diametric front to rear section of a modified form of the invention. Figs. 5 and 6 are elevations of other modified forms of the invention.

Referring to the drawings there is shown a headlight 1 which may be taken as indicative of any type of headlight customarily employed in connection with automobiles and other motor vehicles. As the particular construction of the headlight does not enter into the present invention it is not described in detail.

In Figs. 1 and 2 the headlight is shown as provided with a front lens 2, as is customary with some forms of headlights, but it will be understood that this front member 2 is to be taken as indicative of any front glass such as is used in connection with automobile or other headlights whether such front glass be lens-like or plane. In connection with such a headlight structure as is shown in Figs. 1 and 2, and especially in already installed or manufactured headlights, whether of the acetylene or electric type, a plate 3 is provided and is preferably of glass. This plate in the showing of Figs. 1, 2 and 3 is of segmental form with the body portion including an arc of more than 180 degrees, and is provided on the chord side with a rounded projection 4 of less diameter than the body of the plate. This projection 4 is struck from the same center as the main portion of the plate and merges into the peripheral portion of the plate by reverse-curve portions $4^a$. The plate 3 is mounted in a channel ring 5 leaving between the main body of the plate 3 with the rounded projection 4 and that portion of the ring 5 not occupied by the plate 3 a curved or arc-shaped opening 6 of less than 180 degrees circumferential extent. The plate 3 with its border ring or carrying ring 5 is mounted within the headlight casing immediately back of the front glass 2 where it is held by clips 7 like those usually employed for retaining the front glass 2 in place, and these clips may also serve to hold such front glass in place. Of course, other means for holding the plate 3 in place may be used.

For preventing the plate 3 from turning in the ring 5 the latter is crimped, as shown at 8, or may be otherwise formed immediately adjacent to the end portions of the chord part of the body of the plate 3.

It is not essential that the projection 4 merge into the chord portion of the plate 3 by curves $4^a$, since these portions may be straight, as shown at $4^b$ in Fig. 5.

In the forms of the plate 3 shown in Figs. 1, 2, 3 and 5 the entire plane area of the plate is made light diffusive by sand-blasting or otherwise grinding one or both faces, the ground glass surface being indicated at 9.

Where the light diffusive surface is produced directly upon the front glass of the headlight such glass is then of full circular form, but the ground portion with the dip part 4 is of less area. In Fig. 4 a lens-like front glass $2^a$ is shown and upon one face of this front glass $2^a$ is a ground glass area $9^a$ which may agree in extent with either the showing of Figs. 3 or 5 or may have other conformation such as indicated in Fig. 6 where there is a dip portion or projection $4^b$ of generally triangular shape instead of rounded form like the showing of Figs. 1, 3 and 5. In Fig. 6 there is a clear portion $6^a$ which though not truly concentric on its upper edge with the plate indicated at $3^b$ of Fig. 6, is sufficiently near an approach to arc shape to be considered as generally arc shape, the area and effect of the clear portion $6^a$ of Fig. 6 being like that of the clear portion 6 of the other forms of the invention.

The plate $3^b$ of Fig. 6 may be taken as indicative of a plane plate to be provided with a ring frame 5 permitting the plate to be used as an attachment to an already installed headlight, or the plate $3^b$ may be taken as indicative of the front glass of a headlight, whether plane on both faces or whether lens like in conformity with the showing of Figs. 1, 2 and 4.

The ground glass portion of the headlight may be and preferably is of practically even character and density throughout and the unground or plain portion is practically nondiffusive and unobstructive to the passage of light.

With the highest power headlights it is advisable to produce the ground glass surface upon both faces of either the front glass of the headlight or the supplemental plate when the latter is employed, but with the lower power headlights, say, those employing acetylene burners, the grinding of one face of the front or supplemental plates, whichever be used, is sufficient. It will also be understood that where only one surface is rendered light diffusive by grinding, sand-blasting, or other treatment, it is the front surface that is so treated, since a polished front surface is liable to cause objectionable glare were the sand-blasting or other treatment produced upon the rear surface instead of the front surface.

The ordinary high power headlight with a clear glass front projects an intensely brilliant cone of light many hundred feet in advance of the vehicle, and is so dazzling to observers in front of the vehicle as to interfere seriously with traffic, the blinding light so produced causing many serious accidents.

With the present invention the blinding glare of the headlight which is due to a large extent to the presence of the reflector is for all practical purposes wholly eliminated, but, at the same time, the illuminating effect of the headlight is not to any marked extent diminished. To the occupants of the vehicle an ordinarily dark roadway is brilliantly illuminated to an extent so nearly approaching the illumination afforded by headlights unequipped with the present invention that the presence of the invention is hardly, if at all, noticeable, for the reduction of illumination is almost inappreciable. However, to an observer within the range of the cone of light emitted by the headlight all blinding glare is absent. The presence of the ground glass of an area not only greater in circumferential extent than 180 degrees, but having a drop portion of a form to leave an arc-shaped clear opening in the lower portion of the headlight front, which opening has a circumferential extent of less than 180 degrees, hides from the eye of the observer all glare spots or glare areas due either to the direct rays of light from the light unit within the headlight or glare spots due to reflection of the light from the reflector of the headlight. All the observer sees is a soft light wholly unobtrusive to the eye and having none of the blinding effects so noticeable in the ordinary headlights. The observer is moreover enabled to see quite clearly beyond the approaching vehicle and so avoid all danger of accident.

Usually the headlights of automobiles and similar motor vehicles are not more than three or four feet above the roadway, so that the eye of the usual observer is considerably higher, but it is necessary in order to prevent reflection glares to have the drop portion 4 of the light diffusive device low enough to prevent any rays of light directed from the reflector of the headlight from reaching the eye of the observer directly in front of the headlight. More often, however, the observer is to one side of the axial line of the headlight, wherefore the drop portion must be extended sidewise sufficiently to take care of reflection glares. Also, the main body of the light diffusive device must extend lower than the horizontal diameter of the headlight in order that there shall be no distracting glares when the observer is close to, but to one side of the axial line of the headlight.

All the brilliant undiffused light emitted from the headlight below a horizontal line some degrees lower than the horizontal diameter of the headlight and outside of an area still lower than such diameter but not there reaching to the outer edge of the light emitting end of the headlight need not be subject to diffusion, but may be utilized in its full intensity and directness for illuminating the roadway for practically its full breadth and many feet in front of the vehicle since such an area of light directed at a lowering angle toward the roadway is out of the range of vision of the observer so far as glare spots are concerned. For this reason the ground glass surface is of less area than a complete circle so as to leave a practically arc-shaped area for the clear and non-diffused emission of light of the full intensity from the headlight where it will brilliantly illuminate the roadway for so great a distance ahead of the vehicle as to answer all practical purposes. The diffusive portion of the headlight opening at the same time causes a strong illumination still farther ahead of the vehicle, and at the sides of the roadway to apprise the occupant of the traveling vehicle of any obstructions far in advance of the circumscribed area of brilliant illumination. In fact, in practice the illumination afforded by a headlight of a certain power equipped with the present invention is not to any marked extent less efficient than that afforded by the same headlight without the present invention. The effect, however, upon the observer approaching the headlight or toward whom the headlight is traveling is very markedly different in that all obtrusive or blinding glares are subdued and eliminated, and the eye of the observer is not so affected but that dangers which may be behind the approaching vehicle can be seen and avoided.

The drop of the downward extension 4 of the ground glass surface is such that should the headlight of the automobile or other vehicle be pointed upwardly with respect to the observer as sometimes happens when the vehicle is approaching the top of a hill on one side and the observer is at the other side of the crown of the hill, both the light giving unit of the headlight and portions of the reflector which might otherwise be visible are hidden by the ground glass surface in a manner to prevent distracting or blinding glares. Furthermore, no sharp line of demarcation is produced between the area of extreme brilliancy and that of diffused illumination, wherefore the occupant of the vehicle is able to readily see for many hundred feet in advance of the vehicle all objects which would be visible by means of the headlight were the present invention absent, but a person or persons approaching the vehicle, or being approached by the vehicle are entirely protected from the effects of brilliant and blinding glares.

The present application is a continuation of my application No. 848,602, filed July 2, 1914, in so far as the general features of the two applications are concerned, the arrangement of the present application differing from that of the prior application in that the clear inverted arc-shaped light emitting area at the bottom portion of the front of the headlight is effectively less than 180 degrees in circumferential extent, and at no point reaches as high as the line of the horizontal diameter of the light emitting end of the headlight, this being a particularly important feature of the present invention and productive of the peculiar and effective results obtained.

What is claimed is:—

1. In a headlight projector, the combination of a reflector so constructed as to produce a central field of great intensity and concentric zones of varying intensity diminishing toward the edge thereof, and a glare eliminator adapted to be located in front of the light-giving element and reflector, comprising glass means having a ground-glass surface of a form and area to wholly occupy the upper portion of the light-emitting front of the headlight for its full width to a line below the horizontal diameter of said front and from thence as a drop portion of less width than said front and stopping short of the bottom thereof to leave a clear area with rising ends at said bottom portion, the encroachment of the full-width and drop portions of the ground glass area upon the lower half of the headlight front being such as to provide a light diffusive shield protecting the eye of an observer from direct view of the light-giving element and those portions of the headlight reflector productive of intense illumination, whereby the entire field of light produced by the headlight is utilizable for illumination without distractive glare and all intense glare-producing illumination is limited to an area below the line of direct observation under all conditions of practical use of the headlight.

2. A glare eliminator for headlights provided with a centrally located light giving element and reflecting means producing zones of reflected light surrounding the light source, comprising a plate of glass adapted to be located at the light emitting end of the headlight and having a ground-glass light-diffusing surface of even texture embracing an arc of more than one hundred and eighty degrees with said surface occupying all of the upper half and a fractional portion of the lower half of the light emitting end of the headlight and provided with a further continuation into the lower half of said front in the form of a drop of less width than the first-named portion, the area covered by the ground glass surface and the character of the latter being such as to protect the eye of an observer in front of the headlight from direct view of the source of light and the glare producing zones of the reflector, and the area of illumination caused by the headlight remaining unrestricted.

3. An attachment for headlights having light-giving elements and reflectors therein, said attachment being adapted to be applied to the headlight adjacent to the glass front thereof, and comprising a substantially segmental sheet of ground glass including an arc of more than one hundred and eighty degrees and less than three hundred and sixty degrees and provided with an extension from and intermediate of and less in width than the chord side of the segment, and a ring-shaped carrier for the sheet of glass extending about the margin of the main body thereof and in spaced relation to the extension of said main body to there define an arc-shaped clear space free from glass between the projecting portion of the main body and the ring-shaped carrier, the area of the ground glass surface including the extension being such as to interpose between the eye of an observer and both the light-giving element of the headlight and the areas of intense illumination of the reflector of the headlight under all conditions of practical use of such headlight.

In testimony that I claim the foregoing as my own, I have hereto affixed my signature in the presence of two witnesses.

JOHN EDWARD MORRISON.

Witnesses:
 EDNA B. JORDAN,
 ALONZO BENNETT.